(12) United States Patent
Veit et al.

(10) Patent No.: US 9,745,824 B2
(45) Date of Patent: Aug. 29, 2017

(54) CHECK VALVE FOR WELL STIMULATION

(71) Applicant: Halliburton Energy Services, Inc., Houston, TX (US)

(72) Inventors: Jan Veit, Plano, TX (US); Jean-Marc Lopez, Plano, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 213 days.

(21) Appl. No.: 13/888,946

(22) Filed: May 7, 2013

(65) Prior Publication Data

US 2014/0007954 A1    Jan. 9, 2014

Related U.S. Application Data

(63) Continuation of application No. 13/881,164, filed as application No. PCT/US2012/045365 on Jul. 3, 2012, now Pat. No. 8,739,887.

(51) Int. Cl.
*F16K 15/04* (2006.01)
*E21B 21/10* (2006.01)
(Continued)

(52) U.S. Cl.
CPC ............ *E21B 34/10* (2013.01); *E21B 21/103* (2013.01); *E21B 34/08* (2013.01); *E21B 43/16* (2013.01);
(Continued)

(58) Field of Classification Search
CPC ................ F16K 15/021; F16K 15/183; F16K 15/04–15/048; F16K 15/188;
(Continued)

(56) References Cited

U.S. PATENT DOCUMENTS 1,001,246 A * 8/1911 Budlong .................. 137/533.13
1,600,956 A * 9/1926 Duckworth ......... F04B 53/1002
166/328
(Continued)

FOREIGN PATENT DOCUMENTS

WO          9857082 A1    12/1998
WO       2008128839 A1    10/2008
(Continued)

OTHER PUBLICATIONS

International Search Report and Written Opinion for PCT/US2012/045365 dated Feb. 28, 2013.

*Primary Examiner* — Kevin Murphy
*Assistant Examiner* — Jonathan Waddy
(74) *Attorney, Agent, or Firm* — McDermott Will & Emery LLP

(57) ABSTRACT

Disclosed are check valve assemblies operable to inject treatment fluids during stimulation operations. One check valve assembly includes a valve body defining an inlet, one or more discharge ports, and a cylindrical passageway that fluidly communicates the inlet with the one or more discharge ports, the valve body further providing a cylindrical section in which the one or more discharge ports are defined, a valve cap disposed about an exterior of the cylindrical section and defining an opening that fluidly communicates with the cylindrical passageway, and a spherical piston disposed within the passageway and movable between a closed configuration, where the spherical piston prevents fluid communication between the inlet and the one or more discharge ports, and an open configuration, where fluid communication is allowed between the inlet and the one or more discharge ports.

19 Claims, 5 Drawing Sheets

(51) Int. Cl.
 *E21B 34/08* (2006.01)
 *E21B 34/10* (2006.01)
 *E21B 43/16* (2006.01)
 *E21B 43/26* (2006.01)

(52) U.S. Cl.
 CPC .............. *E21B 43/26* (2013.01); *F16K 15/04*
 (2013.01); *Y10T 137/5196* (2015.04); *Y10T*
 *137/7859* (2015.04); *Y10T 137/7904* (2015.04)

(58) Field of Classification Search
 CPC ......... Y10T 137/5196; Y10T 137/7859; Y10T
 137/7904; E21B 21/103; E21B 34/08
 USPC ............ 137/516.11, 516.13, 516.15, 516.25,
 137/516.27, 533.11, 533.13, 270, 625;
 251/65, 343–346; 166/316, 319, 321,
 166/325, 328
 See application file for complete search history.

(56) References Cited

U.S. PATENT DOCUMENTS

| | | | | |
|---|---|---|---|---|
| 1,624,914 | A * | 4/1927 | Beechtel ...................... | 137/232 |
| 1,666,962 | A * | 4/1928 | Wilson ................... | F04B 53/12 |
| | | | | 137/512.3 |
| 1,712,948 | A * | 5/1929 | Burch ...................... | E21B 21/10 |
| | | | | 166/328 |
| 2,216,092 | A * | 9/1940 | Northon ................ | F16K 15/021 |
| | | | | 137/332 |
| 2,278,715 | A * | 4/1942 | Stoyke .................... | F16K 15/04 |
| | | | | 137/533.13 |
| 2,667,895 | A * | 2/1954 | Pool ........................ | F16K 15/06 |
| | | | | 137/528 |
| 3,211,173 | A * | 10/1965 | Mueller et al. ............ | 137/454.5 |
| 3,279,487 | A * | 10/1966 | Elam ................... | A61M 16/208 |
| | | | | 128/204.19 |
| 3,358,770 | A * | 12/1967 | Zandmer ............... | E21B 33/146 |
| | | | | 137/543.13 |
| 3,421,586 | A * | 1/1969 | Solum ................... | E21B 43/045 |
| | | | | 166/158 |
| 3,491,790 | A * | 1/1970 | Sanford ................... | 137/533.11 |
| 3,911,950 | A * | 10/1975 | Lowe et al. .............. | 137/543.17 |
| 4,642,097 | A * | 2/1987 | Siposs ................... | A61M 39/24 |
| | | | | 137/512.3 |
| 4,702,272 | A * | 10/1987 | MacGuire ............ | F02M 23/095 |
| | | | | 123/585 |
| 4,764,046 | A * | 8/1988 | Kitamura et al. ............ | 401/270 |
| 4,948,349 | A * | 8/1990 | Koiwa ................ | F04B 53/1002 |
| | | | | 137/516.11 |
| 5,127,474 | A * | 7/1992 | Schroeder, Jr. ........ | E21B 43/045 |
| | | | | 166/151 |
| 5,320,136 | A * | 6/1994 | Morris .................. | F16K 15/021 |
| | | | | 137/516.29 |
| 5,704,393 | A * | 1/1998 | Connell ................... | E21B 17/06 |
| | | | | 137/614.21 |
| 5,913,664 | A * | 6/1999 | Shimizu .................. | F16K 17/04 |
| | | | | 137/614.2 |
| 6,000,417 | A * | 12/1999 | Jacobs .................. | F16K 15/023 |
| | | | | 137/2 |
| 6,155,291 | A * | 12/2000 | Powell .................. | F16K 15/035 |
| | | | | 137/512 |
| 7,506,663 | B2 * | 3/2009 | Thomas ................ | F16K 15/023 |
| | | | | 137/529 |
| 7,644,758 | B2 * | 1/2010 | Coronado ............... | E21B 43/08 |
| | | | | 166/205 |
| 8,739,887 | B2 | 6/2014 | Veit et al. | |
| 2006/0180209 | A1 | 8/2006 | Riley et al. | |
| 2008/0041452 | A1 | 2/2008 | Zweber | |
| 2014/0014345 | A1 | 1/2014 | Veit et al. | |

FOREIGN PATENT DOCUMENTS

| | | |
|---|---|---|
| WO | 2010053378 A2 | 5/2010 |
| WO | 2010087719 A1 | 8/2010 |
| WO | 2011095512 A2 | 8/2011 |
| WO | 2011115494 A1 | 9/2011 |

* cited by examiner

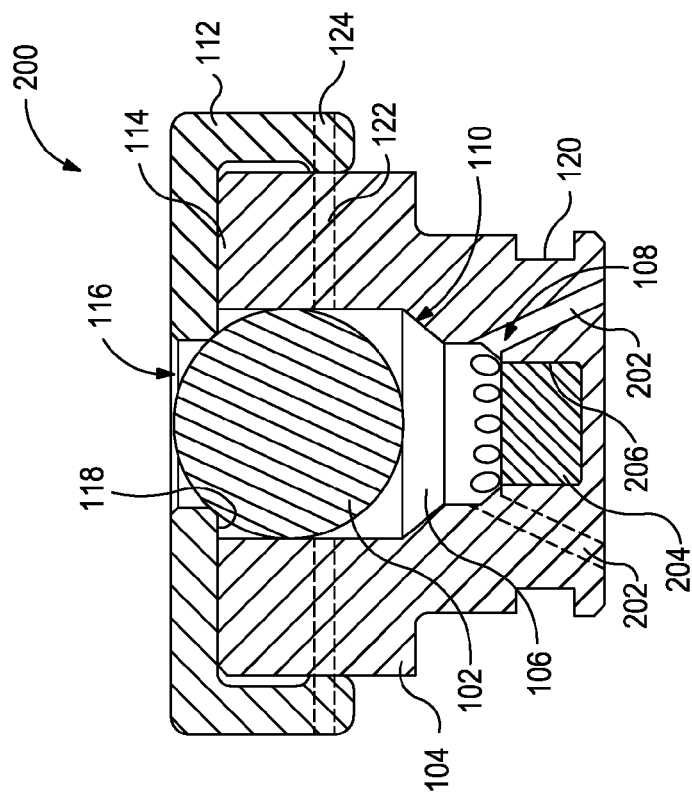
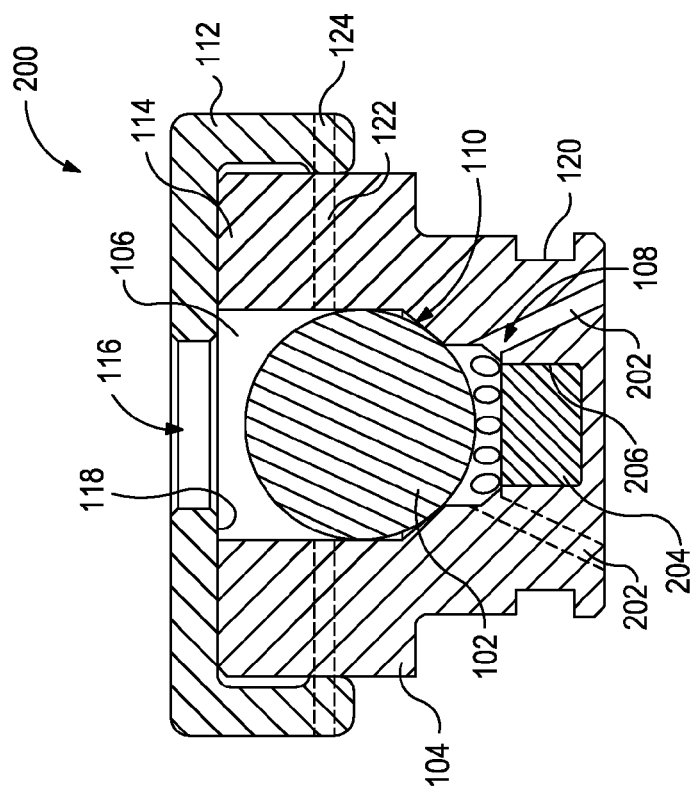
FIG. 5A
FIG. 5B

CHECK VALVE FOR WELL STIMULATION

CROSS-REFERENCE TO RELATED APPLICATIONS

The present application is a continuation of U.S. patent application Ser. No. 13/881,164 filed on Apr. 24, 2013, which is a National Stage entry of and claims priority to International Application No. PCT/US2012/045365 filed on Jul. 3, 2012.

BACKGROUND

The present invention relates to equipment utilized in subterranean well operations and, more particularly, to check valve assemblies operable to inject treatment fluids during stimulation operations while preventing inflow of production fluids.

In the course of drilling and construction of wellbores that traverse hydrocarbon bearing formations, it is oftentimes desirable to inject treatment fluids into the wellbore for a number of purposes. For example, hydrochloric acid solutions are often injected into the wellbore to stimulate the hydrocarbon bearing formation. In such cases, the hydrochloric acid solution can be injected into the subterranean formation to react with acid-soluble materials disposed in the formation, thereby enlarging pore spaces in the formation. These acidizing treatments are designed to improve the formation permeability, which consequently enhances production of reservoir fluids. Typically, such acidizing operations are performed at a high flowrate, but at a treatment pressure below the fracture pressure of the formation such that the acid is able to penetrate an extended distance into the formation without damaging the formation.

Attempts have been made to inject treatment fluids as reverse flow through conventional inflow control devices that utilize one or more flow restrictors such as flow tubes, nozzles, labyrinths, or the like. Inflow control devices are often used to control the rate of fluid inflow into a production casing and generally feature a dual-walled tubular housing with one or more inflow passages laterally disposed through the inner wall of the housing. A sand screen often surrounds a portion of the tubular housing, and production fluid can enter the sand screen and then negotiate, for example, a tortuous pathway between the dual walls to reach the inflow passages. The tortuous pathway serves to slow the rate of flow and maintain it in an even manner.

It has been found, however, that the flowrate required for acidizing operations is typically higher than the production flowrate from the formation. As such, reverse flow through conventional inflow control devices can result in an unacceptably high pressure drop in the treatment fluid. Accordingly, a need has arisen for an apparatus that is operable to enable injection of a treatment fluid into the wellbore and the surrounding formation. A need has also arisen for such an apparatus that is operable to enable injection of the treatment fluid at a high flowrate. Further, a need has also arisen for such an apparatus that is operable to enable injection of the treatment fluid without an unacceptably high pressure drop.

SUMMARY OF THE INVENTION

The present invention relates to equipment utilized in subterranean well operations and, more particularly, to check valve assemblies operable to inject treatment fluids during stimulation operations while preventing inflow of production fluids.

In some embodiments, a check valve assembly is disclosed. The check valve assembly may include a valve body defining an inlet, one or more discharge ports, and a cylindrical passageway fluidly communicating the inlet with the one or more discharge ports, the valve body further defining a valve body seat within the passageway; a valve cap configured to be coupled to the valve body and defining an opening therein that fluidly communicates with the cylindrical passageway, the valve cap further providing a valve cap seat; and a spherical piston disposed within the passageway and movable between a closed configuration where the spherical piston engages the valve body seat to prevent fluid communication between the inlet and the one or more discharge ports and an open configuration where the spherical piston engages the valve cap seat and allows fluid communication between the inlet and the one or more discharge ports.

In other embodiments, another check valve assembly is disclosed. The check valve assembly may include a valve body defining an inlet, one or more discharge ports, and a cylindrical passageway fluidly communicating the inlet with the one or more discharge ports, the valve body further defining a valve body seat within the passageway; a valve cap configured to be coupled to the valve body and defining an opening therein that fluidly communicates with the cylindrical passageway, the valve cap further providing a valve cap seat; a piston disposed within the passageway and movable between a closed configuration where the piston engages the valve body seat to prevent fluid communication between the inlet and the one or more discharge ports and an open configuration where the piston engages the valve cap seat and allows fluid communication between the inlet and the one or more discharge ports; and a magnet arranged within the valve body and configured to bias the piston toward the closed configuration.

In yet other embodiments, a method for regulating the injection of a stimulation fluid into a subterranean formation is disclosed. The method may include arranging a base pipe within the subterranean formation, the base pipe having a check valve assembly arranged therewith, the check valve assembly having a valve body defining an inlet, one or more discharge ports, and a cylindrical passageway fluidly communicating the inlet with the one or more discharge ports, the check valve assembly further having a piston movably disposed within the passageway; magnetically-attracting the piston into engagement with a valve body seat defined in the passageway such that the piston is biased to a closed configuration that prevents fluid communication between the inlet and the one or more discharge ports; and injecting the stimulation fluid into the base pipe at a rate sufficient to induce the piston to move between the closed configuration and an open configuration where the piston engages a valve cap seat defined in a valve cap coupled to the valve body and defining an opening therein, the opening providing fluid communication between the cylindrical passageway and the subterranean formation.

The features and advantages of the present invention will be readily apparent to those skilled in the art upon a reading of the description of the preferred embodiments that follows.

BRIEF DESCRIPTION OF THE DRAWINGS

The following figures are included to illustrate certain aspects of the present invention, and should not be viewed as exclusive embodiments. The subject matter disclosed is capable of considerable modifications, alterations, combi

FIGS. 5A-5B are cross-sectional views of another check valve assembly, according to one or more embodiments.

DETAILED DESCRIPTION

The present invention relates to equipment utilized in subterranean well operations and, more particularly, to check valve assemblies operable to inject treatment fluids during stimulation operations while preventing inflow of production fluids.

The exemplary check valve assemblies and methods of using the same disclosed herein may advantageously enhance well stimulation operations. For example, the exemplary check valve assemblies may be operable to enable injection of a treatment fluid into the wellbore and the surrounding formation. In addition, the exemplary check valve assemblies may be operable to enable injection of the treatment fluid at a high flowrate, but simultaneously without an unacceptably high pressure drop. Moreover, the exemplary check valve assemblies are designed to operate autonomously, that is, the check valve assemblies can switch between open and closed configurations as needed to control the injection of stimulation fluid without constant monitoring by a user, for example. As a result, the assemblies provide a simplified means of stimulating subterranean hydrocarbon bearing formations.

Figure 1:
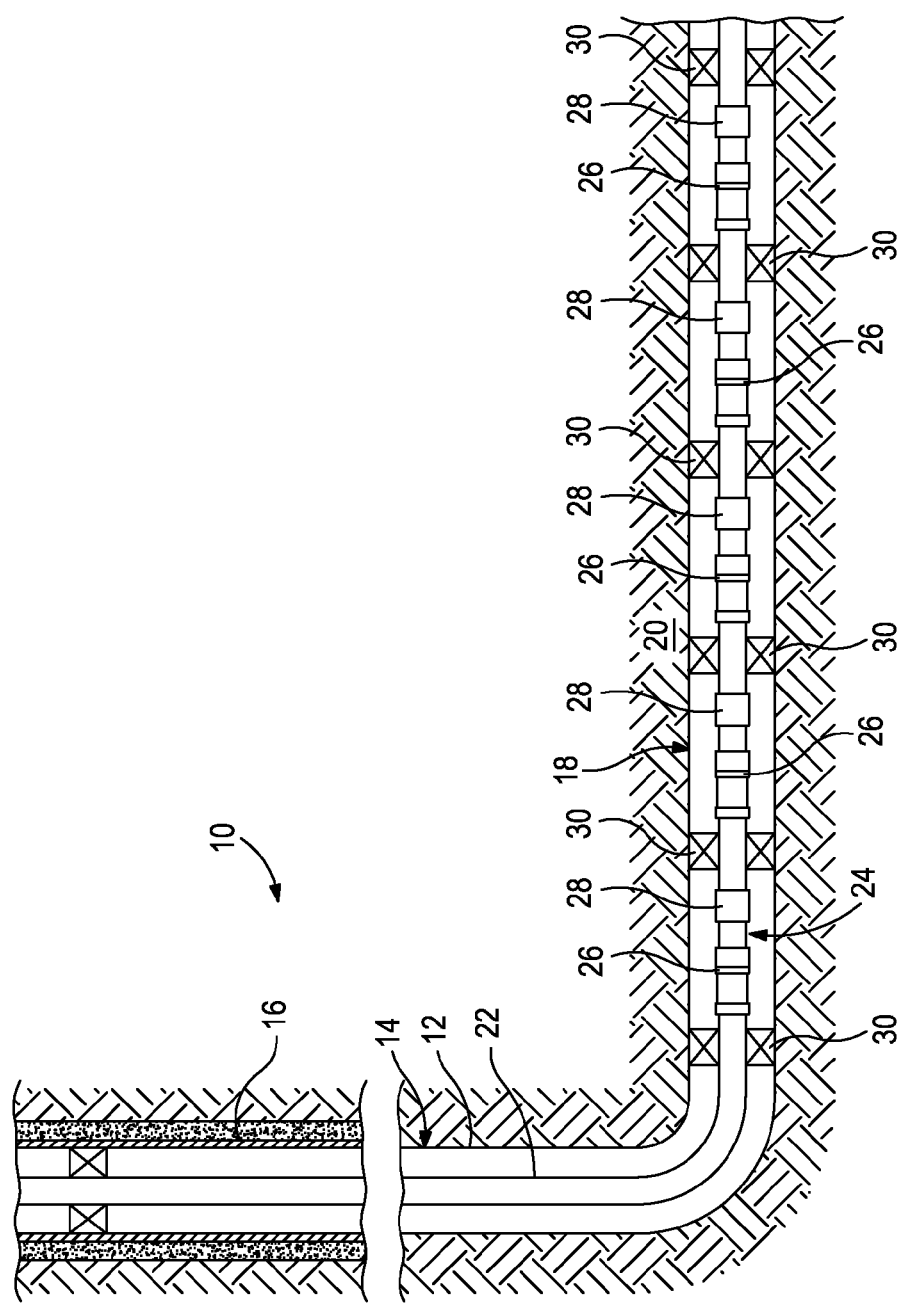
- FIG. 1 is a schematic illustration of a well system including a plurality of injection assemblies, according to one or more embodiments.

FIG. 1 schematically illustrates a well system 10 including a plurality of injection assemblies embodying one or more aspects of the present disclosure. In the illustrated embodiment, a wellbore 12 extends through the various earth strata and has a substantially vertical section 14, the upper portion of which has cemented therein a casing string 16. The wellbore 12 also has a substantially horizontal section 18 that extends through a hydrocarbon bearing subterranean formation 20. As illustrated, the substantially horizontal section 18 of the wellbore 12 may be arranged in an open hole portion of the wellbore 12. In other embodiments, however, the horizontal section 18 be arranged in a completed portion of the wellbore 12, with appropriate perforations defined in the casing string 16 and accompanying cement, without departing from the scope of the disclosure.

Positioned within the wellbore 12 and extending from the surface is a tubing string 22. The tubing string 22 provides a conduit for formation fluids to travel from the formation 20 to the surface. At its lower end, the tubing string 22 is coupled to a completion string 24 that has been installed in the wellbore 12 and divides the completion interval into various production intervals adjacent the formation 20. The completion string 24 includes a plurality of sand control screen assemblies 26 and a plurality of injection assemblies 28. In addition, the completion string 24 includes a plurality of packers 30 that provides fluid seals between the completion string 24 and the wellbore 12, thereby defining the various production intervals.

The sand control screen assemblies 26 primarily serve to filter particulate matter (e.g., sand and fines) out of the production fluid stream. The migration of particulate matter into the wellbore 12 or near-wellbore area can severely restrict production. In some applications, the sand control screen assemblies 26 may include one or more inflow control devices configured to control the flowrate of the production fluid stream into the completion string 24. An exemplary inflow control device may utilize one or more flow restrictors such as flow tubes, nozzles, labyrinths, or the like, to control the production flowrate. Moreover, however, in certain completions, it may also be desirable to stimulate the formation 20 to improve permeability, which can enhance production of reservoir fluids. In one type of stimulation operation, acid, such as a hydrochloric acid solution, may be injected into the formation 20 via the inflow control devices at a flowrate significantly higher than the design production flowrate. Such reverse flow through the inflow control devices may result in an unacceptably high pressure drop in the treatment fluid.

In order to avoid unacceptably high pressure drop in the treatment fluid, the well system 10 may further include one or more injection assemblies 28 that may be positioned within each production interval. As will be described in more detail below, in operation the injection assemblies 28 may be configured to undertake stimulation operations capable of uniformly treating the formation 20 by injecting the desired treatment fluid at the desired high flowrate, and without experiencing an unacceptably high pressure drop.

It should be noted that while FIG. 1 depicts the injection assemblies 28 in an open hole environment, the injection assemblies 28 are equally well suited for use in cased wells. Moreover, while FIG. 1 depicts one sand control screen assembly 26 and one corresponding injection assembly 28 arranged in each production interval, those skilled in the art will readily recognize that any number of sand control screen assemblies 26 and any number of injection assemblies 28 in any ratio relative to each other may be deployed within a particular production interval without departing from the scope of the disclosure. In addition, even though FIG. 1 depicts multiple production intervals separated by packers 30, the completion interval may have any number of production intervals including a single interval with a corresponding number of packers 30 or no packers 30.

Furthermore, even though FIG. 1 depicts the injection assemblies 28 as arranged in the horizontal section 18 of the wellbore 12, it should be understood by those skilled in the art that the injection assemblies 28 are equally well suited for use in wells having other directional configurations including vertical wells, deviated wells, slanted wells, multilateral wells and the like. Accordingly, it should be understood by those skilled in the art that the use of directional terms such as above, below, upper, lower, upward, downward, left, right, uphole, downhole and the like are used in relation to the illustrative embodiments as they are depicted in the figures, the upward direction being toward the top of the corresponding figure and the downward direction being toward the bottom of the corresponding figure, the uphole direction being toward the surface of the well and the downhole direction being toward the toe of the well.

Figure 2A:
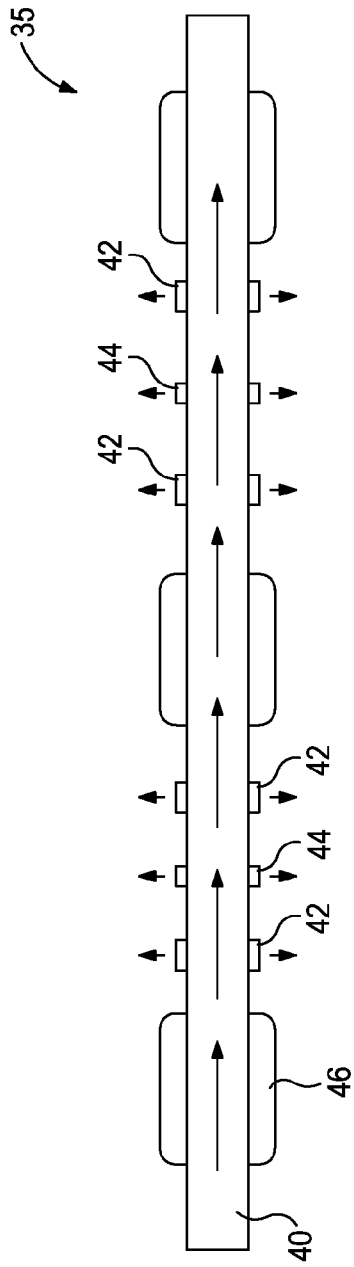
FIGS. 2A-2B are schematic illustrations of a completion casing assembly, according to one or more embodiments.
Figure 2B:
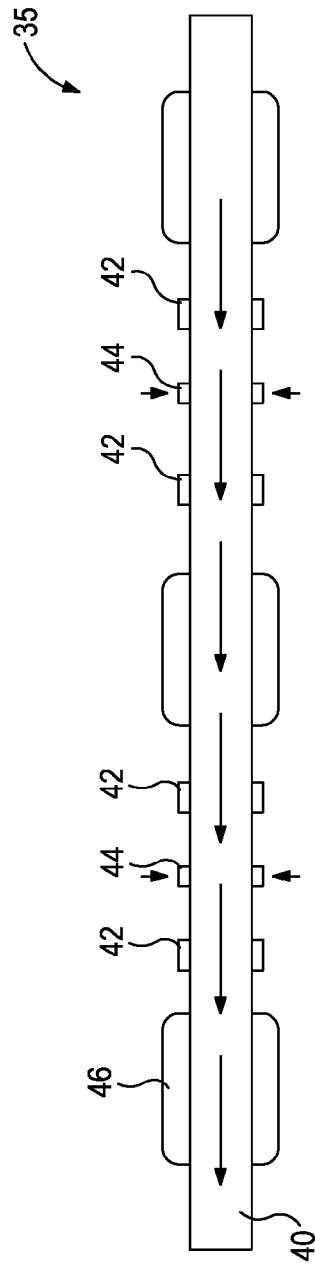

Referring now to FIGS. 2A and 2B, illustrated are schematic representations of an exemplary completion string assembly 35, according to one or more aspects of the disclosure. As shown, the completion string assembly 35 includes a base pipe 40, one or more check valve assemblies 42, and one or more inflow control devices 44. While the illustrated embodiment shows a specific number of check valve assemblies 42 and inflow control devices 44, it should be understood that any number of check valve assemblies 42 and/or inflow control devices 44 may be used, without departing from the scope of the disclosure. The completion string assembly 35 can form zonal isolations 46 when the completion string assembly 35 is placed in a well (e.g., the wellbore 12 of FIG. 1) in order to prevent cross-flow of fluids during well production operations.

In particular, FIG. 2A illustrates the flow direction (see arrows) of a stimulation treatment fluid during an exemplary well stimulation phase of a drilling operation. The direction of fluid flow is primarily determined by the difference between pressure inside of base pipe 40 and outside pressure; i.e., the pressure of the formation 20 (FIG. 1). In the embodiment shown in FIG. 2A, the pressure inside of the base pipe 40 is greater than the formation pressure during stimulation operations. The pressure inside of the base pipe 40 may be applied, for example, by a pump located at the surface which is used to inject the stimulation fluid into the base pipe 40. The stimulation fluid travels downhole through the base pipe 40 and is eventually released into the formation 20 (FIG. 1) through the injection assemblies 42 and/or the inflow control devices 44.

FIG. 2B illustrates the direction of the production fluid flow during an exemplary well production phase of a drilling operation. In the embodiment shown, the pressure of the formation 20 (FIG. 1) is greater than the pressure inside of base pipe 40 and therefore the production fluid is able to flow into the base pipe 40. Those skilled in the art will recognize that this pressure differential is normal in the absence of a substantial external pressure applied downhole. As shown, this pressure differential forces the one or more check valve assemblies 42 to remain closed during well production, thus causing the production fluid from the formation 20 to enter into the base pipe 40 solely or primarily through the inflow control devices 44.

Figure 3:
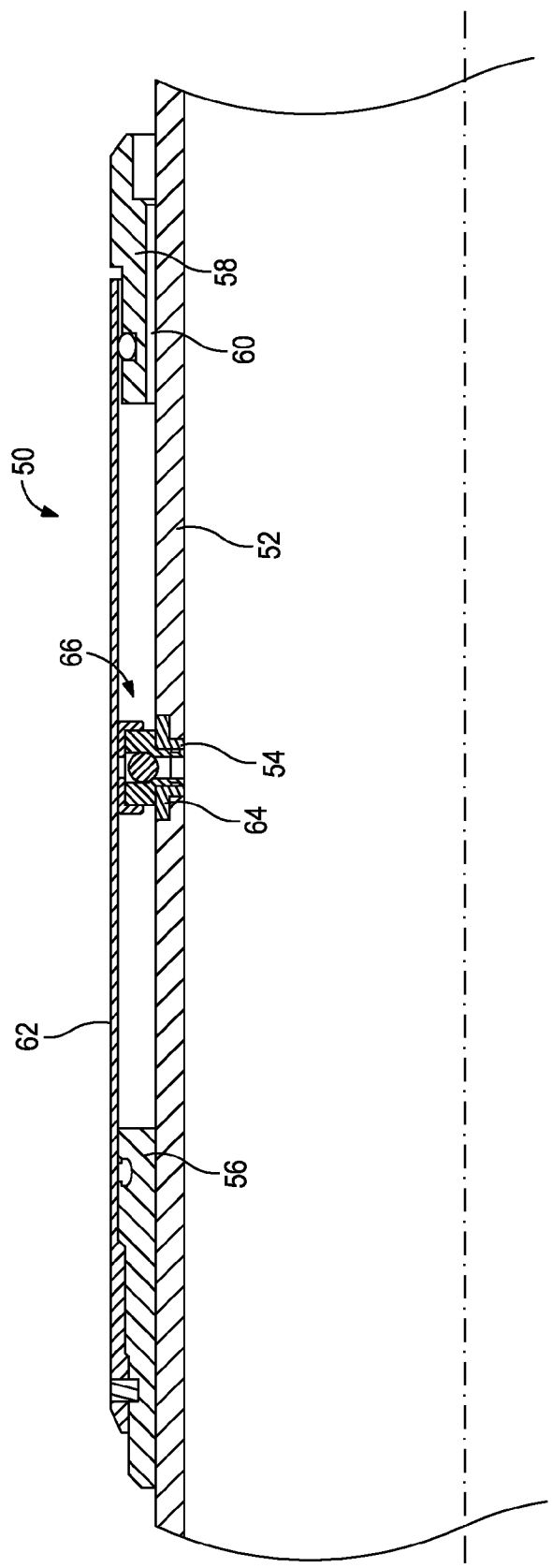
FIG. 3 is a cross-sectional view of an injection assembly including at least one check valve assembly, according to one or more embodiments.

Referring now to FIG. 3, illustrated is an exemplary injection assembly 50 used for well stimulation operations, according to one or more embodiments of the disclosure. As shown, the injection assembly 50 may include a base pipe 52 that defines one or more openings 54 where one or more corresponding check valve assemblies 66 may be seated or otherwise arranged. The injection assembly 50 may further include an upper connection assembly 56 and a lower connection assembly 58 disposed about the base pipe 52 and securably attached thereto by welding or other suitable means. The lower connection assembly 58 may define a plurality of channels 60 that provides a path for fluid injection from the injection assembly 50 and into the wellbore. Alternatively or additionally, the upper connection assembly 56 may provide a path for fluid injection from the injection assembly 50 and into the wellbore. An outer sleeve 62 may be coupled to both the upper and lower connection assemblies 56, 58 at opposing ends of the injection assembly 50.

In the illustrated embodiment, an insert ring 64 may be positioned within the opening 54 of the base pipe 52. The insert ring 64 may be securably coupled within the opening 54 by welding, threading, or similar attachment techniques. In other embodiments, however, the insert ring 64 may be press-fit into the opening 54 and held in place with an interference fit. The insert ring 64 may have a inner diameter sized to receive and retain the check valve assembly 66 therein. In some embodiments, the insert ring 64 may include an extension (not pictured) designed to radially align the check valve assembly 66 and/or component parts thereof with the base pipe 52 such that any fluid discharged from the check valve assembly 66 is directed in the axial direction of the injection assembly 50 and not in the circumferential direction. As can be appreciated, such predetermined alignment of the check valve assembly 66 may substantially prevent erosion of the sleeve 62. As illustrated, the sleeve 62 may have a close fitting relationship with the check valve assembly 66 which ensures that the check valve assembly 66 remains fixed in the insert ring 64 and the component parts of the check valve assembly 66 remain properly configured and oriented during operation.

Figures 4A, 4B:
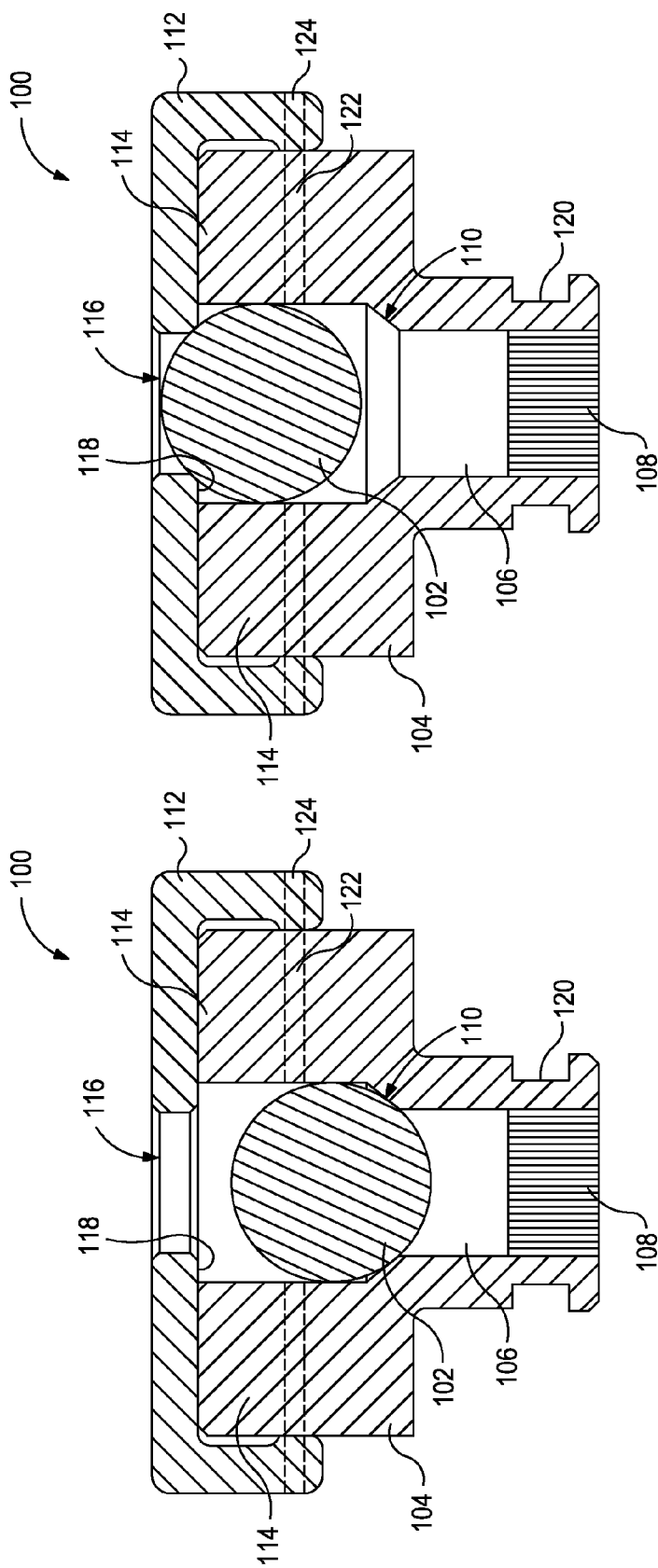
FIGS. 4A-4B are cross-sectional views of an exemplary check valve assembly, according to one or more embodiments.

Referring now to FIGS. 4A and 4B, illustrated are cross-sectional views of an exemplary check valve assembly 100, according to one or more embodiments. The check valve assembly 100 may be similar in some respects to the check valve assembly 66 of FIG. 3, and therefore may be best understood with reference thereto. Specifically, FIG. 4A depicts the check valve assembly 100 in a closed configuration which restricts flow of fluid into the base pipe 52 (FIG. 3), and FIG. 4B depicts the check valve assembly in an open configuration which allows stimulation fluid to flow into the surrounding formation 20 (FIG. 1). In one or more embodiments, the check valve assembly 100 may include a valve body 104 that defines a cylindrical passageway 106 that leads to or is otherwise fluidly coupled to an inlet 108. The inlet 108 may fluidly communicate with the interior of, for example, the base pipe 52 (FIG. 3). The valve body 104 may define or otherwise form a valve body seat 110 within the passageway 106. In some embodiments, the inlet 108 may define a plurality of conduits that fluidly connect the passageway 106 with the base pipe 52 (FIG. 3).

A piston 102 may be movably disposed within the passageway 106 and generally free to move axially within the passageway 106 in order to control the injection of stimulation fluid into the surrounding formation 20 (FIG. 1). In one embodiment, the piston 102 may be a generally spherical ball, such as a ball bearing or the like. In other embodiments, however, the piston 102 may include other shapes such as, but not limited to, frustoconical, polygonal, ovoid, combinations thereof, or the like.

The valve body 104 may have a cylindrical section 114 configured to receive a valve cap 112 thereabout. In some embodiments, the valve cap 112 is mechanically fastened to the cylindrical section 114 such as by, but not limited to, welding, brazing, threadably engaging, combinations thereof, or the like. In other embodiments, the valve cap 112 may be press fit onto the cylindrical section such that an interference fit between the two components is generated, without departing from the scope of the disclosure. The valve cap 112 may define a central opening 116 and a valve cap seat 118, and when the valve cap 112 is suitably coupled to the cylindrical section 114, the central opening 116 may fluidly communicate with the passageway 106 and the valve cap seat 118 may engage or otherwise be in close contact with the cylindrical section 114. The valve body 104 may also include an o-ring groove 120 operable to receive an o-ring (not shown) therein which provides a seal and support between the valve body 104 and the insert ring 64 (FIG. 3).

As shown, the valve body 104 may define a plurality of discharge ports 122 that extend radially from the passageway 106. The discharge ports 122 may be in fluid communication with the inlet 108 via the passageway 106. While only two discharge ports 122 are illustrated in FIGS. 4A and 4B, it will be appreciated that more than two discharge ports 122 may be employed, without departing from the scope of the disclosure. In one or more embodiments, one or more of the discharge ports 122 may be axially aligned with corresponding discharge ports 124 defined in the valve cap 112 and extending radially therethrough. As a result, the contiguously aligned discharge ports 122, 124 defined in the valve body 104 and the valve cap 112 may provide fluid communication between the passageway 106 and the exterior of the check valve assembly 100. In other embodiments, however, the valve cap 112 may be axially shorter, such that the discharge ports 122 provide direct fluid communication between the passageway 106 and the exterior of the check valve assembly 100.

As illustrated, the discharge ports 122 may be oppositely disposed, and therefore may be referred to as a pair of oppositely disposed discharge ports 122. It will be appreciated, however, that the valve cap 112 may have additional discharge ports 122 not particularly shown in the cross-sectional views of FIGS. 4A and 4B. In some embodiments, the additional discharge ports may be angularly offset from the discharge ports 122 shown in FIGS. 4A and 4B by about 90°. In other embodiments, however, the additional discharge ports may be angularly offset from the discharge ports 122 shown in FIGS. 4A and 4B by angular configurations greater or less than 90° (e.g., 45°). As will be appreciated, this allows selective alignment of the discharge ports 124 defined in the valve cap 112 with the discharge ports 122 of the valve body 104.

For example, when the discharge ports 124 are aligned with the discharge ports 122, as shown in FIGS. 4A and 4B, flow through the additional (non-illustrated) discharge ports may be substantially prevented. In this manner, selective positioning of the valve cap 112 on the valve body 104 may determine which set of discharge ports 122 are available for flow which in turn may determine the resistance to flow encounter by the treatment fluid traveling through the check valve assembly 100. In one or more embodiments, the discharge ports 124 defined in the valve cap 112 may have a flow area that is less restrictive than the flow area of the discharge ports 122 defined in the valve body 104, which enables the adjustment of the flowrate and pressure drop of the treatment fluid through the check valve assembly 100, as discussed in greater detail below.

Exemplary operation of the check valve assembly 100 will now be described. When the discharge ports 124 of the valve cap 112 are generally aligned with one or more of the discharge ports 122 of the valve body 104, the check valve assembly 100 may be characterized as being in its more restrictive configuration. Prior to a stimulation operation, the piston 102 may be engaged with or otherwise seated on the valve body seat 110. In this configuration, any pressure exhibited by the wellbore will communicate through the opening 116 of the valve cap 112, which has the effect of biasing the piston 102 downwardly within the passageway 106. The seal created between the piston 102 and valve body 104 (i.e., the valve body seat 110) prevents fluid communication between the inlet 108 and the discharge ports 122 defined in the valve body 104.

Once the stimulation operation commences, however, the piston 102 may be lifted off valve body seat 110 when the pressure inside of the check valve assembly 100 reaches a level sufficient to overcome the opposing wellbore pressure that holds the piston 102 against the valve body seat 110. Once the piston 102 is lifted off the valve body seat 110, the internal pressure of the check valve assembly 100 is now applied to a larger area on the piston 102 which means the pressure to maintain the check valve assembly 100 in the open configuration is less than the pressure required to open the check valve assembly 100. As best seen in FIG. 4B, the piston 102 may travel upwardly (i.e., axially) in the passageway 106 until engaging the valve cap seat 118 and generally forming a seal therewith. In at least one embodiment, the piston 102 may be configured to be seated within or otherwise substantially occlude the central opening 116. In this open configuration, the treatment fluid is able to enter the check valve assembly 100 via the inlet 108 and exit the check valve assembly 100 through the discharge ports 122 of the valve body 102 and the discharge ports 124 of the valve cap 112.

In some embodiments, the pressure differential experienced across the check valve assembly 100 may act on the piston 102 such that the piston 102 may reside, at least temporarily, inside the passageway 106 without forming a seal with either the valve cap 112 or the valve body seat 110, but is instead balanced between the two surfaces. Such a configuration can allow the stimulation fluid to exit into the formation 20 (FIG. 1) through the opening 116 defined in the valve cap 112 and/or through the injection ports 122 and 124.

When the stimulation operation is complete, the internal pressure within the check valve assembly 100 may be reduced until it is no longer sufficient to overcome the opposing wellbore pressure. The piston 102 may then descend once again within the passageway 106 until reengaging the valve body seat 110, as best seen in FIG. 4A. In this closed configuration, the production fluids are again generally prevented from entering the base pipe 52 (FIG. 3) through the check valve assembly 100.

Referring now to FIGS. 5A and 5B, illustrated are cross-sectional views of another exemplary check valve assembly 200, according to one or more embodiments of the disclosure. More particularly, FIG. 5A shows a cross-sectional view of the check valve assembly 200 in the closed configuration, and FIG. 5B shows a cross-sectional view of the check valve assembly 200 in the open configuration, thereby allowing free flow of stimulation fluids into the formation 20 (FIG. 1). The check valve assembly 200 may be best understood with reference to FIGS. 4A and 4B, where like numerals are used to indicate like elements. As with the check valve assembly 100 of FIGS. 4A and 4B, the check valve assembly 200 may include the valve body 104 that defines the cylindrical passageway 106. The valve body 104 may also define the inlet 108. As shown in FIGS. 5A and 5B, the inlet 108 may be characterized or otherwise include one or more conduits 202 defined in the valve body 104 and configured to provide fluid communication between the passageway 106 and the interior of the base pipe 52 (FIG. 3). Each inlet conduit 202 may be arranged circumferentially about the bottom portion of passageway 106 and provide an angled configuration with respect to the central axis of the passageway 106.

In some embodiments, a magnet 204 may be arranged within the valve body 104 adjacent the inlet 108. For example, the magnet 204 may be seated within a recess 206 generally defined in the bottom portion of the valve body 104. As illustrated, the inlet conduits 202 may extend through the valve body 104 about a radial periphery of the recess 206, such that the inlet conduits 202 do not intersect any portion of the recess 206 but are otherwise arranged circumferentially about the periphery. In some embodiments, the magnet 204 may be a permanent magnet. In other embodiments, the magnet 204 may be an electromagnet configured to switch between magnetized and a non-magnetized modes of operation.

In at least one embodiment, the piston 102 may be made of a ferromagnetic material or otherwise attracted to the magnet 204. The resulting magnetic attractive force applied on the piston 102 provides a downward force on piston 102 so that it is urged to engage or otherwise bias the valve body seat 110. In other embodiments, portions of the valve body seat 110 may be magnetic and serve a similar purpose in magnetically attracting the piston 102 downwardly. The magnetic attractive force may be sufficient to maintain the piston 102 in the closed configuration (FIG. 5A) until the pressure differential experienced across the check valve assembly 200 overcomes the magnetic force.

Exemplary operation of the check valve assembly 200 will now be described. When the discharge ports 114 defined in the valve cap 112 are aligned with the discharge ports 122 of the valve body 104, the check valve assembly 200 is in its more restrictive configuration. Prior to the stimulation operation, as best seen in FIG. 5A, the piston 102 may be engaged with the valve body seat 110. In this configuration, the fluid pressure in the wellbore is able to communicate through the opening 116 defined in the valve cap 112, which, along with any attractive force between piston 102 and the magnet 204, urges the piston 102 downwardly. The mechanical seal created between the piston 102 and the valve body 104 prevents fluid communication between the inlet 108 and the discharge ports 122.

Once the stimulation operation commences, the pressure within the base pipe 502 (FIG. 3) increases and serves to force the piston 102 off of the valve body seat 110. For example, the fluid pressure applied for the stimulation operation is conducted to the passageway 106 through the one or more inlet conduits 202 of the inlet 108 and may eventually reaches a level sufficient to overcome the opposing wellbore pressure and attractive forces between the piston 102 and the magnet 204. Once the piston 102 is lifted off the valve body seat 110, the internal pressure of the check valve assembly 100 is then applied to a larger area on the piston 102 which means the pressure to maintain the check valve assembly 200 in the open configuration is less than the pressure required to open the check valve assembly 200. As best seen in FIG. 5B, the piston 102 may be configured to translate upwardly within the passageway 106 until engaging the valve cap seat 118, and forming a mechanical seal therewith. In at least one embodiment, the piston 102 may be configured to be seated within or otherwise substantially occlude the central opening 116. In this configuration, the treatment fluid is able to enter the check valve assembly 200 via the inlet 108 and exit the check valve assembly 200 through the discharge ports 122 of the valve body 202 and the discharge ports 114 of the valve cap 112.

In some embodiments, the pressure differential experienced across the check valve assembly 200 may act on the piston 102 such that the piston 102 may reside, at least temporarily, inside the passageway 106 without forming a mechanical seal with either the valve cap 112 or the valve body seat 110, but is instead balanced between the two surfaces. Such a configuration can allow the stimulation fluid to exit into the formation 20 (FIG. 1) through the opening 116 defined in the valve cap 112 and/or through the injection ports 122 and 124.

When the stimulation operation is complete, the internal pressure within the check valve assembly 100 may be reduced until it is no longer sufficient to overcome the combined opposing wellbore pressure and attractive force between the piston 102 and the magnet 204. The piston 102 may then descend within the passageway 106 until once again engaging the valve body seat 110, as best seen in FIG. 5A. In this closed configuration, the production fluids are again generally prevented from entering the base pipe 52 (FIG. 3) through check valve assembly 200.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope and spirit of the present invention. The invention illustratively disclosed herein suitably may be practiced in the absence of any element that is not specifically disclosed herein and/or any optional element disclosed herein. While compositions and methods are described in terms of "comprising," "containing," or "including" various components or steps, the compositions and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

The invention claimed is:

1. A check valve assembly, comprising:
 a valve body providing a cylindrical section that defines one or more valve body discharge ports, the valve body defining an inlet and a cylindrical passageway that fluidly communicates the inlet with the one or more valve body discharge ports, wherein the inlet comprises a plurality of conduits that extend through the valve body at an angle between perpendicular and parallel to a central axis of the cylindrical passageway;
 a valve cap coupled to the valve body and extending about an outer circumference of the cylindrical section, wherein the valve cap covers an end of the cylindrical section and defines an opening that fluidly communicates with the cylindrical passageway;
 one or more valve cap discharge ports extending radially through the valve cap and alignable with the one or more valve body discharge ports about the outer circumference of the cylindrical section, wherein the valve cap is movable with respect to the valve body to selectively align and misalign the one or more valve cap discharge ports with the one or more valve body discharge ports;
 one or more additional valve cap discharge ports extending radially through the valve cap and angularly offset from the one or more valve cap discharge ports, the one or more additional valve cap discharge ports being alignable with the one or more valve body discharge ports; and a spherical piston disposed within the cylindrical passageway and movable between a closed configuration, where the spherical piston prevents fluid communication between the inlet and the one or more valve body discharge ports, and an open configuration, where the spherical piston is seated within the opening and fluid communication is thereby allowed between the inlet and the one or more valve body discharge ports.

2. The check valve assembly of claim 1, wherein the valve cap is threaded to the end of the cylindrical section.

3. The check valve assembly of claim 1, wherein the valve cap is press fitted onto the end of the cylindrical section.

4. The check valve assembly of claim 1, wherein the one or more valve body discharge ports extend radially from the cylindrical passageway.

5. The check valve assembly of claim 1, wherein aligning the one or more valve cap discharge ports with the one or more valve body discharge ports results in a first resistance to flow and aligning the one or more additional valve cap discharge ports with the one or more valve body discharge ports results in a second resistance to flow different than the first resistance to flow.

6. The check valve assembly of claim 1, wherein, when the one or more valve cap discharge ports are aligned with the one or more valve body discharge ports, fluid communication is facilitated between the cylindrical passageway and an exterior of the check valve assembly.

7. The check valve assembly of claim 1, wherein the valve body further defines a valve body seat within the cylindrical passageway and wherein, when in the closed configuration, the spherical piston engages the valve body seat.

8. A check valve assembly comprising:
a valve body providing a cylindrical section that defines one or more valve body discharge ports, the valve body defining an inlet and a cylindrical passageway that fluidly communicates the inlet with the one or more valve body discharge ports, wherein the inlet comprises a plurality of conduits that extend through the valve body at an angle between perpendicular and parallel to a central axis of the cylindrical passageway;
a valve cap coupled to the valve body and extending about an outer circumference of the cylindrical section, wherein the valve cap covers an end of the cylindrical section and defines an opening that fluidly communicates with the cylindrical passageway;
one or more valve cap discharge ports extending radially through the valve cap and alignable with the one or more valve body discharge ports about the outer circumference of the cylindrical section, wherein the valve cap is movable with respect to the valve body to selectively align and misalign the one or more valve cap discharge ports with the one or more valve body discharge ports;
one or more additional valve cap discharge ports extending radially through the valve cap and angularly offset from the one or more valve cap discharge ports, the one or more additional valve cap discharge ports being alignable with the one or more valve body discharge ports;
a piston disposed within the cylindrical passageway and movable between a closed configuration, where the piston prevents fluid communication between the inlet and the one or more valve body discharge ports, and an open configuration, where fluid communication is allowed between the inlet and the one or more valve body discharge ports; and
a magnet arranged within the valve body and configured to magnetically attract the piston toward the closed configuration.

9. The check valve assembly of claim 8, wherein the inlet provides fluid communication between the cylindrical passageway and an interior of a base pipe.

10. The check valve assembly of claim 8, wherein the magnet is arranged within a recess defined in the valve body adjacent the inlet.

11. The check valve assembly of claim 10, wherein the plurality of conduits is arranged circumferentially about a radial periphery of the recess.

12. The check valve assembly of claim 8, wherein aligning the one or more valve cap discharge ports with the one or more valve body discharge ports results in a first resistance to flow and aligning the one or more additional valve cap discharge ports with the one or more valve body discharge ports results in a second resistance to flow different than the first resistance to flow.

13. The check valve assembly of claim 8, wherein, when the one or more valve cap discharge ports are aligned with the one or more valve body discharge ports, fluid communication is facilitated between the cylindrical passageway and an exterior of the check valve assembly.

14. The check valve assembly of claim 8, wherein the valve body further defines a valve body seat within the cylindrical passageway and the piston engages the valve body seat in the closed configuration.

15. The check valve assembly of claim 14, wherein the magnet comprises the valve body seat.

16. An injection assembly, comprising:
a base pipe defining a pipe opening and being arranged within a wellbore penetrating a subterranean formation; and
a check valve assembly positioned within the pipe opening and including:
a valve body providing a cylindrical section that defines one or more valve body discharge ports, the valve body defining an inlet and a cylindrical passageway that fluidly communicates the inlet with the one or more valve body discharge ports, wherein the inlet comprises a plurality of conduits that extend through the valve body at an angle between perpendicular and parallel to a central axis of the cylindrical passageway;
a valve cap secured to the valve body and extending about an outer circumference of the cylindrical section, wherein the valve cap covers an end of the cylindrical section and defines a central opening that fluidly communicates with the cylindrical passageway;
one or more valve cap discharge ports extending radially through the valve cap and alignable with the one or more valve body discharge ports about the outer circumference of the cylindrical section, wherein the valve cap is movable with respect to the valve body to selectively align and misalign the one or more valve cap discharge ports with the one or more valve body discharge ports; and
a spherical piston disposed within the cylindrical passageway and movable between a closed configuration, where the spherical piston prevents fluid communication between the inlet and the one or more valve body discharge ports, and an open configuration, where fluid communication is allowed between the inlet and the one or more valve body discharge ports.

17. The injection assembly of claim 16, further comprising:
- an upper connection assembly disposed about the base pipe;
- a lower connection assembly disposed about the base pipe and axially offset from the upper connection assembly;
- an outer sleeve coupled to and extending between the upper and lower connection assemblies, wherein the check valve assembly axially interposes the upper and lower connection assemblies and the valve cap is positioned adjacent an inner surface of the outer sleeve; and
- a channel defined axially through at least one of the upper and lower connections and facilitating fluid communication between the check valve assembly and an exterior of the outer sleeve.

18. The injection assembly of claim 16, further comprising an insert ring positioned within the pipe opening and interposing the pipe opening and the valve body.

19. The injection assembly of claim 16, further comprising one or more additional valve cap discharge ports angularly offset from the one or more valve cap discharge ports and alignable with the one or more valve body discharge ports wherein aligning the one or more valve cap discharge ports with the one or more valve body discharge ports results in a first resistance to flow and aligning the one or more additional valve cap discharge ports with the one or more valve body discharge ports results in a second resistance to flow different than the first resistance to flow.

* * * * *